United States Patent [19]

Colberg et al.

[11] Patent Number: 4,764,599
[45] Date of Patent: Aug. 16, 1988

[54] DISAZO COMPOUNDS CONTAINING AN N,N-BIS(2-AMINO-BENZOYL)PIPERAZINE DERIVATIVE AS THE DIAZO COMPONENT

[75] Inventors: Horst Colberg, Schifferstadt; Erwin Hahn, Heidelberg, both of Fed. Rep. of Germany

[73] Assignee: BASF Aktiengesellschaft, Rheinland-Pfalz, Fed. Rep. of Germany

[21] Appl. No.: 913,376

[22] Filed: Sep. 30, 1986

[30] Foreign Application Priority Data

Oct. 10, 1985 [DE] Fed. Rep. of Germany ....... 3536196

[51] Int. Cl.$^4$ ................ C09B 31/11; C09B 31/14; C09B 33/12; C09B 35/34
[52] U.S. Cl. .................. 534/740; 534/573; 534/603; 534/604; 534/605; 534/649; 534/650; 534/728; 534/741; 534/742; 534/745; 534/752; 534/756; 534/757; 534/759; 534/762; 534/763; 534/764; 534/772; 534/773; 534/774; 534/797; 106/22; 106/496; 106/498
[58] Field of Search ............. 534/740, 742, 756, 757, 534/797, 759, 772, 773, 774, 573, 603, 604, 605, 649, 741, 745, 728, 752, 762, 763, 764

[56] References Cited

U.S. PATENT DOCUMENTS 4,051,123 9/1977 Piller et al. ................ 534/797 X

FOREIGN PATENT DOCUMENTS 2539162 3/1977 Fed. Rep. of Germany ...... 534/797
60-94476 5/1985 Japan .................. 534/797

Primary Examiner—Floyd D. Higel
Attorney, Agent, or Firm—Oblon, Fisher, Spivak, McClelland & Maier

[57] ABSTRACT

Sulfo-free compounds of the formula

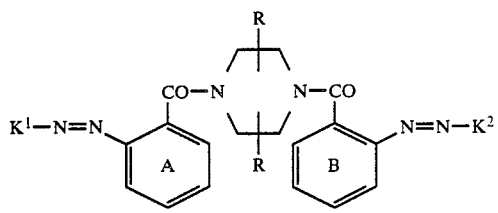

where
R is hydrogen or $C_1$–$C_4$-alkyl and
$K^1$ and $K^2$ independently of one another are a radical of a coupling component, and the rings A and B may furthermore be monosubstituted or polysubstituted by fluorine, chlorine, bromine, nitro, methyl, trifluoromethyl, ethyl, acetyl, benzoyl, a carboxylic ester group, unsubstituted or substituted carbamyl or sulfamyl, an aryl sulfonate group, $C_1$–$C_4$-alkylsulfonyl, unsubstituted or substituted phenylsulfonyl, cyano or acylamino or a fused ring, are very useful as pigments for coloring printing inks, surface coatings or plastics.

3 Claims, No Drawings

DISAZO COMPOUNDS CONTAINING AN N,N-BIS(2-AMINO-BENZOYL)PIPERAZINE DERIVATIVE AS THE DIAZO COMPONENT

The present invention relates to sulfo-free compounds of the general formula I

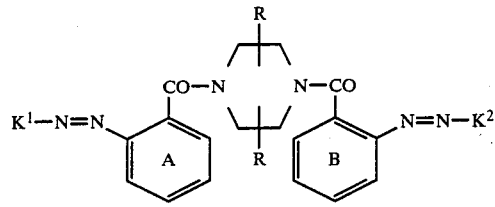

where

R is hydrogen or $C_1$–$C_4$-alkyl and $K^1$ and $K^2$ independently of one another are a radical of a coupling component, and the rings A and B may furthermore be monosubstituted or polysubstituted by fluorine, chlorine, bromine, nitro, methyl, trifluoromethyl, ethyl, acetyl, benzoyl, a carboxylic ester group, unsubstituted or substituted carbamyl or sulfamyl, an aryl sulfonate group, $C_1$–$C_4$-alkylsulfonyl, unsubstituted or substituted phenylsulfonyl, cyano or acylamino or a fused ring.

Specific examples of substituents for rings A and B, in addition to those stated above are $COOCH_3$, $COOC_2H_5$, $COOC_3H_7$, $COOCH(CH_3)_2$, $COOC_4H_9$, $COOC_6H_5$, $COOC_6H_{13}$, $COOC_8H_{17}$, $COOC_2H_4OCH_3$, $COOC_2H_4OC_2H_5$, $COOCH_2C_6H_5$, $CONH_2$, $CONHCH_3$, $CONHC_2H_5$, $CONHC_3H_7$, $CONHC_4H_9$, $CONHCH(CH_3)_2$, $CONHCH_2C_6H_5$, $CONHC_6H_5$, $CONHC_6H_4Cl$, $CONHC_6H_3Cl_2$, $CONHC_6H_2Cl_3$, $CONHC_6H_4Br$, $CONHC_6H_4OCH_3$, $CONHC_6H_4CH_3$, $CONHC_6H_4OC_2H_5$, $CONHC_6H_3Cl(OCH_3)$, $CONHC_6H_4NHCOCH_3$, $CONHC_6H_4NHCOC_6H_5$, $CONHNHCOC_6H_5$, $CONHNHCOC_6H_4Cl$, $CONHNHCOC_6H_4CH_3$, $SO_2NH_2$, $SO_2NHCH_3$, $SO_2NHC_2H_5$, $SO_2NHC_3H_7$, $SO_2NHC_4H_9$, $SO_2NHCH(CH_3)_2$, $SO_2NHCH_2C_6H_5$, $SO_2NHC_6H_5$, $SO_2NHC_6H_4Cl$, $SO_2NHC_6H_3Cl_2$, $SO_2NHC_6H_2Cl_3$, $SO_2NHC_6H_4Br$, $SO_2NHC_6H_4OCH_3$, $SO_2NHC_6H_4CH_3$, $SO_2NHC_6H_4OC_2H_5$, $SO_2NHC_6H_3Cl(OCH_3)$, $SO_2NHC_6H_4NHCOCH_3$, $SO_2NHC_6H_4NHCOC_6H_5$, $SO_2NHNHCOC_6H_5$, $SO_2NHNHCOC_6H_4Cl$, $SO_2NHNHCOC_6H_4CH_3$, $SO_2OC_6H_5$, $SO_2OC_6H_4CH_3$, $SO_2OC_6H_4Cl$, $SO_2OC_6H_4Br$, $SO_2OC_6H_4OCH_3$, $SO_2OC_6H_4NHCOCH_3$, $SO_2OC_6H_3Cl_2$, $SO_2CH_3$, $SO_2C_2H_5$, $SO_2C_6H_5$, $SO_2C_6H_4Cl$, $NHCOCH_3$, $NHCOC_2H_5$, $NHCOC_6H_5$, $NHCONH_2$, $NHCON(CH_3)_2$ and $NHCONHC_6H_5$.

Examples of suitable coupling components $K^1H$ and $K^2H$ are compounds of the phenol, naphthol, acetoacetarylide, pyrazolone, quinolone, pyridine, pyrimidine, isoquinoline and pyrazolo[5,1-b]quinazolone series. Apart from phenol, o-, m- and p-cresol, 1-naphthol, 2-naphthol and resorcinol, these compounds are essentially of the formulae:

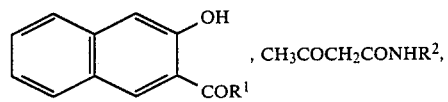

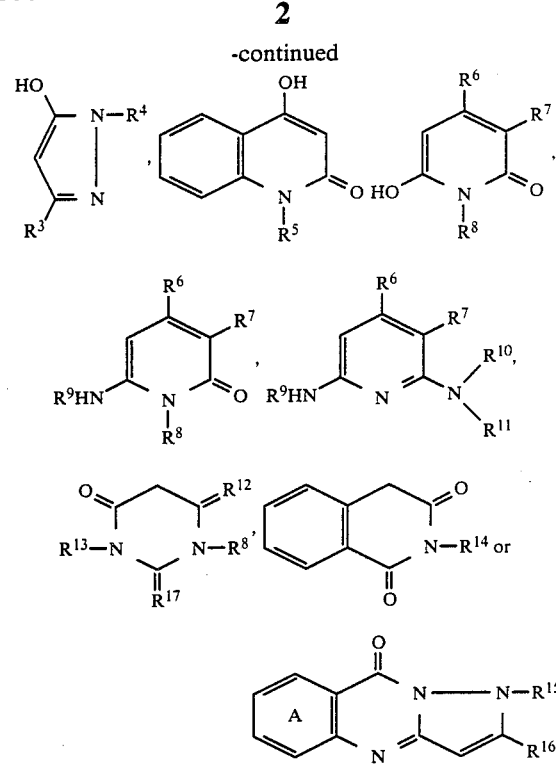

where $R^1$ is $C_1$–$C_4$-alkoxy, unsubstituted or substituted phenoxy or unsubstituted or substituted arylamino, $R^2$ is unsubstituted or substituted aryl, $R^3$ is hydrogen, methyl, carboxyl, $C_1$–$C_8$-alkoxycarbonyl, unsubstituted or substituted carbamyl or the substituents stated for $R^2$, $R^4$ is hydrogen or the substituents stated for $R^2$, $R^5$ is hydrogen or $C_1$–$C_{13}$-alkyl, $R^6$ is hydrogen, hydroxyl, unsubstituted or substituted amino or $C_1$–$C_4$-alkyl, $R^7$ is hydrogen, cyano, carbamyl, acetyl or benzoyl, $R^8$ and $R^{13}$ independently of one another are each hydrogen or unsubstituted or substituted alkyl, cycloalkyl, phenyl or benzyl, $R^9$, $R^{10}$ and $R^{11}$ independently of one another are each hydrogen or unsubstituted or substituted alkyl, cycloalkyl or phenyl, or $R^{10}$ and $R^{11}$ together with the nitrogen may furthermore form a 5-membered or 6-membered heterocyclic ring, $R^{12}$ and $R^{17}$ independently of one another are each oxygen, amino or cyanoimino, $R^{14}$ is a radical $R^8$, amino or acylamino, $R^{15}$ is hydrogen or unsubstituted or substituted phenyl and $R^{16}$ is hydroxyl, methyl, a carboxylic ester group or unsubstituted or substituted aryl or acylamino, and the ring A may be substituted in the stated manner.

Specific examples of the radicals $R^1$ to $R^{16}$, in addition to those listed above are the following substituents:

$R^1$ is $OCH_3$, $OC_2H_5$, $OC_6H_5$, $OC_6H_4Cl$, $OC_6H_3Cl_2$, $NHC_6H_5$, $NHC_6H_4Cl$, $NHC_6H_3Cl_2$, $NHC_6H_2Cl_3$, $NHC_6H_3Cl(CH_3)$, $NHC_6H_4CH_3$, $NHC_6H_4C_2H_5$, $NHC_6H_3(OCH_3)_2$, $NHC_6H_3(CH_3)(OCH_3)$, $NHC_6H_3(CH_3)_2$, $NHC_6H_2(OCH_3)_2Cl$, $NHC_6H_2(OCH_3)(CH_3)Cl$, $NHC_6H_3Cl(OCH_3)$, $NHC_6H_4NHCOCH_3$, $NHC_6H_4NHCOC_6H_5$, $NHC_6H_4OC_2H_5$,

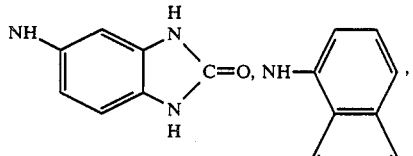

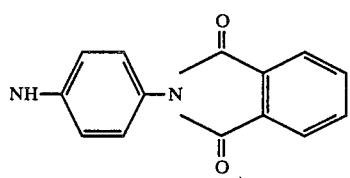

or NHC$_6$H$_3$(OC$_2$H$_5$)$_2$;

R$^2$ is C$_6$H$_5$, C$_6$H$_4$Cl, C$_6$H$_4$CH$_3$, C$_6$H$_4$OCH$_3$, C$_6$H$_4$OC$_2$H$_5$, C$_6$H$_4$NHCOCH$_3$, C$_6$H$_4$NHCOC$_6$H$_5$, C$_6$H$_3$Cl$_2$, C$_6$H$_3$(CH$_3$)$_2$, C$_6$H$_3$(OCH$_3$)$_2$, C$_6$H$_3$(OC$_2$H$_5$)$_2$, C$_6$H$_3$Cl(CH$_3$), C$_6$H$_3$Cl(OCH$_3$), C$_6$H$_3$(CH$_3$)(OCH$_3$), C$_6$H$_2$Cl$_3$, C$_6$H$_2$(OCH$_3$)$_2$Cl, C$_6$H$_2$(OCH$_3$)Cl(CH$_3$),

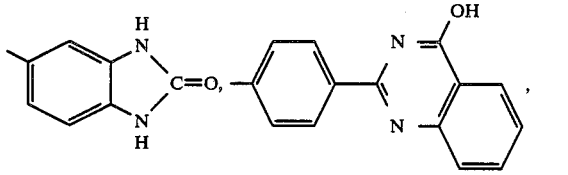

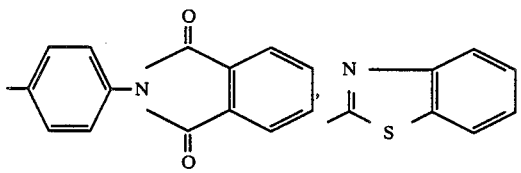

C$_6$H$_4$NO$_2$, C$_6$H$_4$COCH$_3$ or C$_6$H$_4$COC$_6$H$_5$;

R$^3$ is COOCH$_3$, COOC$_2$H$_5$, COOC$_3$H$_7$, COOC$_4$H$_9$, CONH$_2$, CONHCH$_3$, CONHC$_2$H$_5$, CONHC$_3$H$_7$ or CONHC$_4$H$_9$;

R$^5$ is CH$_3$, C$_2$H$_5$, C$_3$H$_7$, C$_4$H$_9$, C$_6$H$_{13}$, C$_8$H$_{17}$, C$_{12}$H$_{25}$ or C$_{13}$H$_{27}$;

R$^6$ is CH$_3$, C$_2$H$_5$, C$_3$H$_7$, C$_4$H$_9$, C$_5$H$_{11}$ α-ethylphenyl, phenyl, methylphenyl or chlorophenyl;

R$^8$ and R$^{13}$ are each methyl, ethyl, propyl, butyl, β-hydroxyethyl, β-methoxyethyl, γ-methoxypropyl, β-cyanoethyl, β-carbomethoxyethyl, β-carboethoxyethyl, β-acetoxyethyl, β-ethoxycarbonylethyl, γ-acetylaminopropyl, phenoxycarbonyloxyethyl, phenylaminocarbonyloxyethyl, butylaminocarbonyloxyethyl, benzyl, β-phenethyl, phenyl, dichlorophenyl, trichlorophenyl, acetylaminophenyl, carboxyphenyl, cyanophenyl, chlorophenyl, sulfoethyl, pentyl, hexyl, octyl, nonyl, decyl, dodecyl, tridecyl, methylphenyl, dimethylphenyl, methylchlorophenyl, methoxyphenyl, heptyl, tetradecyl, hexadecyl, octadecyl, eicosyl, docosyl, oleyl or other radicals of industrial fatty amines, such as coconut fatty amine or tallow fatty amine or their hydrogenation products; other examples are amino-substituted alkyl radicals, such as C$_1$-C$_{18}$-mono- or dialkylamino-substituted alkyl, cycloalkylaminoalkyl, aralkylaminoalkyl, or alkyl substituted by a N-heterocylic structure, and these aminoalkyl radicals may furthermore be quaternary radicals. Alkyl is preferably of 2 or 3 carbon atoms, ie. of the formula c$_2$H$_4$ or, in particular, C$_3$H$_6$. Specific examples of radicals are C$_2$H$_4$N(CH$_3$)$_2$, C$_2$H$_4$N(C$_2$H$_5$)$_2$, C$_2$H$_4$N(C$_3$H$_7$)$_2$, C$_2$H$_4$N(C$_4$H$_9$)$_2$,

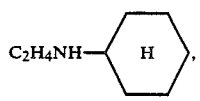 , 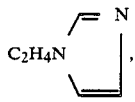 ,

C$_3$H$_6$N(CH$_3$)$_2$                C$_3$H$_6$N(CH$_3$)$_3$ $^\oplus$

C$_3$H$_6$N(C$_2$H$_5$)$_2$           C$_3$H$_6$N(CH$_3$)$_2$(C$_2$H$_4$OH) $^\oplus$ C$_3$H$_6$N(C$_3$H$_7$)$_2$ n und iso      C$_3$H$_6$N(CH$_3$)$_2$(CHCH$_2$OH) $^\oplus$
                                                    |
                                                    CH$_3$ C$_3$H$_6$N(C$_4$H$_9$)$_2$           C$_3$H$_6$N(CH$_3$)(C$_2$H$_5$)$_2$ $^\oplus$ C$_3$H$_6$N(CH$_3$)(C$_3$H$_7$)$_2$ $^\oplus$

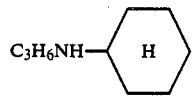

C$_3$H$_6$N(CH$_3$)(C$_4$H$_9$)$_2$ $^\oplus$

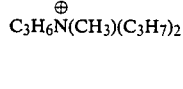

C$_3$H$_6$N(C$_2$H$_5$)$_2$(C$_2$H$_4$OH) $^\oplus$

C$_3$H$_6$NHC$_3$H$_6$OCH$_3$
C$_3$H$_6$NHC$_2$H$_4$OCH$_3$
C$_3$H$_6$NHC$_{12}$H$_{25}$
C$_3$H$_6$NHC$_{18}$H$_{35}$
C$_3$H$_6$NHC$_{18}$H$_{37}$
C$_3$H$_6$NHC$_{14}$H$_{29}$
C$_3$H$_6$NHC$_{16}$H$_{33}$
C$_3$H$_6$N(C$_{18}$H$_{37}$)$_2$

R$^9$, R$^{10}$ and R$^{11}$ are each alkyl of 1 to 8 carbon atoms, C$_2$-C$_6$-alkyl which is substituted by hydroxyl, cyano, alkoxy of 1 to 8 carbon atoms, phenoxy, phenoxyethoxy or benzyloxy, or cyclohexyl, benzyl, phenylethyl, phenylhydroxyethyl, phenylpropyl or phenylbutyl, or phenyl which is unsubstituted or substituted by chlorine, methyl, methoxy or ethoxy, or polyalkoxyalkyl, hydroxypolyalkoxyalkyl, alkanoyloxyalkyl, alkoxycarbonylalkyl, alkanoyl, aralkanoyl, aroyl, alkylsulfonyl or arylsulfonyl, for example the radicals stated in U.S. Pat. No. 3,998,802;

$R^{14}$ is $C_1$–$C_8$-alkanoylamino or is benzoylamino which is unsubstituted or monosubstituted or disubstituted by hydroxyl, chlorine, methyl, methoxy, acetylamino, nitro or amino;

$R^{15}$ is phenyl, chlorophenyl, dichlorophenyl, trichlorophenyl, bromophenyl, dibromophenyl, methoxyphenyl, methylphenyl or dimethylphenyl;

$R^{16}$ is $COOCH_3$, $COOC_2H_5$, phenyl, the radicals stated for $R^{15}$, $NHCOCH_3$, $NHCOC_2H_5$, $NHCOC_3H_7$, $NHCOC_6H_5$, $NHCOC_6H_4Cl$, $NHCOC_6H_3Cl_2$, $NHCOC_6H_4Br$, $NHCOC_6H_4OCH_3$, $NHCONH_2$, $NHCONHC_6H_5$ or $NHCOCONHC_6H_5$;

Other examples of suitable coupling components are 4-hydroxycoumarin, 2-acetonylbenzothiazole, 2-cyanomethylbenzpothiazole, 2-cyanomethylbenzimidazole, 2-cyanomethyl-4-hydroxyquinazoline, 2-hydroxyquinoxaline, 2-carbamylbenzimidazole, 2-acetonylbenzimidazole, 2-phenyl-4-amino-6-hydroxypyrimidine, 4-carbamyl-2,6-dihydroxypyrimidine, 2,4dihydroxypyrimido[1,2-a]benzimidazole, 4-amino-2-hydroxypyrimido[1,2-a]benzimidazole, 2H-pyrimido[2,1-b]benzothiazole-2,4-(3H)-dione, 1,4-(bisacetoacetamino)benzene and 4,'-bis-(acetoacetamino)-3,3'-dimethyldiphenyl.

Of particular importance are compounds of the formula Ia

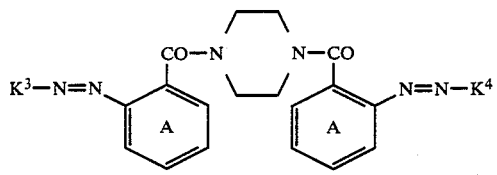

(Ia)

where $K^3$ and $K^4$ independently of one another are each a radical of a coupling component of the acetoacetarylide, pyrazolone, quinolone, pyrimidine, isoquinolone or pyrazolo[5,1-b]quinazolone series or of 2-naphthol and in particular a radical of the pyridine or 2-naphthol-3-carboxylic acid arylamide series, and the phenylene radicals A may be monosubstituted or polysubstituted by chlorine, bromine or nitro, the substituents being identical or different in the case of polysubstitution.

$R^1$ is preferably $NHC_6H_5$ which is unsubstituted or monosubstituted or polysubstituted by chlorine, bromine, methyl, methoxy, ethoxy, nitro, cyano, acetamino, carbamyl or sulfamyl, the substituents being identical or different in the case of polysubstitution, or is preferably

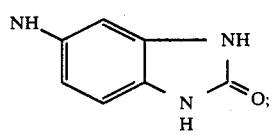

$R^2$ is preferably phenyl which is unsubstituted or monosubstituted or polysubstituted by chlorine, bromine, methyl, methoxy, ethoxy, nitro, cyano, acetamino, carbamyl or sulfamyl, the substituents being identical or different in the case of polysubstitution, $R^3$ is preferably hydrogen, methyl, $C_1$–$C_4$-alkoxycarbonyl, carbamyl, $C_1$–$C_4$-alkylaminocarbonyl or the radicals preferred for $R^2$, $R^4$ is preferably hydrogen or the radicals preferred for $R^2$, $R^5$ is preferably hydrogen or $C_1$–$C_8$-alkyl, $R^6$ is preferably hydrogen, methyl, hydroxyl or amino, $R^7$ is preferably hydrogen, cyano, carbamyl, acetyl or benzoyl, $R^8$ and $R^{13}$ independently of one another are each preferably hydrogen, alkyl, alkenyl, cycloalkyl, benzyl or a radical $R^2$, $R^9$, $R^{10}$ and $R^{11}$ independently of one another are each preferably hydrogen, alkyl, cycloalkyl, benzyl or a radical $R^2$, and $R^{10}$ and $R^{11}$ together with the nitrogen may furthermore form a 5-membered or 6-membered ring, $R^{12}$ and $R^{17}$ independently of one another are each preferably oxygen, imino or cyanoimino, $R^{14}$ is preferably a radical $R^8$ or acylamino, $R^{15}$ is preferably hydrogen or a radical $R^2$ and $R^{16}$ is preferably methyl or a radical $R^2$.

The compounds of the formula (I) can be prepared by reacting a bisdiazonium compound of an amine of the formula (II)

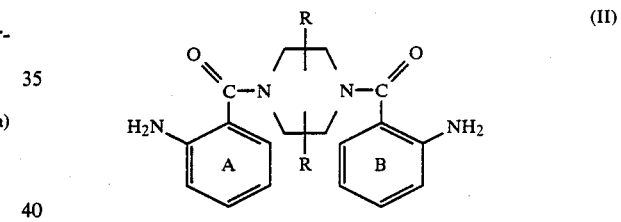

(II)

with coupling components $HK^1$ and $HK^2$, where $HK^1$ and $HK^2$ may be identical or different.

The coupling products (I) are as a rule pigments. They are not always obtained in the optimum physical form for the intended use. However, they may be converted to a suitable pigmentary form by a conventional method, such as milling, in the presence or absence of salts or liquids, or heating in aqueous suspension at a suitable pH or in a solvent.

Another possible method of improving the performance characteristics of the pigments is the known procedure of coating the pigments with compounds which preferably have a similar structure. For the preparation of the coating agent, it is generally advantageous to use the same diazo component and to vary the coupling component. In this case, a mixture of coupling components can be used from the outset for the pigment preparation, the coupling component which leads to the coating agent being added in appropriately small amounts, or the coating agent is synthesized separately and added to the pigmentat a later stage.

For the preparation of printing inks using pigments of the formula (I), it may be advantageous to improve the distribution properties of the pigments in the printing ink by prior coating with resins. Coating may be effected simultaneously with coupling, after coupling or after conditioning.

Some of the pigments of the formula (I) possess good color strength, fastness to overcoating and fastness to migration and are therefore suitable for the preparation of printing inks and surface coatings and for coloring plastics.

The Examples which follow illustrate the preparation and use of compounds of the formula (I). In the Examples, parts and percentages are by weight, unless stated otherwise.

Below, the radical

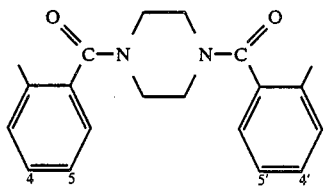

is abbreviated to DIAP<, and substituted radicals are named correspondingly, eg. (5,5'-dibromo DIAP)<.

Examples

EXAMPLE 1

32.4 parts of dianthranilic acid piperazide in 330 parts of water and 170 parts of ice are stirred, 70 parts by volume of concentrated hydrochloric acid are added and diazotization is carried out at room temperature with 64 parts by volume of 23% strength aqueous sodium nitrite solution. After 3 hours, the excess nitrite is destroyed with amidosulfonic acid. The diazotized compound is then gradually added, at 0° C., to a solution of 53.6 parts of N-(2,5-dimethoxy-4-chlorophenyl)-acetoacetamide in 600 parts of water, the said amide initially being dissolved under alkaline conditions and the solution then being brought to pH 6 with hydrochloric acid. Coupling is completed at room temperature at pH 6, and the pigment is filtered off under suction and washed with hot water. Thereafter, it is stirred in fresh water, stirred for 4 hours at pH 10 and 98° C., filtered off under suction, washed and dried. 80 parts of a yellow pigment are obtained, the compound being of the formula

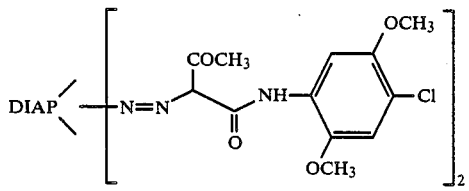

EXAMPLE 2

16.2 parts of dianthranilic acid piperazide in 200 parts of water are stirred, 60 parts by volume of concentrated hydrochloric acid are added dropwise and diazotization is effected at 5° C. with 64 parts by volume of 23% strength aqueous sodium nitrite solution. Stirring is continued at room temperature until a clear solution is formed, the excess nitrite is destroyed with amidosulfonic acid, the solution is filtered, cooled to 0° C. and buffered at pH 2.5 with sodium acetate, and the coupling component prepared as described below is run in. 50 parts of 2-hydroxynaphthalene-3-carboxylic acid N-phenylamide and 1.4 parts of 2-naphthol are dissolved in 50 parts of N-methylpyrrolidone, 32 parts of 50 percent strength sodium hydroxide solution and 500 parts of water at 45° C., and the solution is cooled to room temperature. Coupling is completed at 20° C. and the product is filtered off under suction and washed with water. The filter cake is stirred in water and brought to pH 10 with sodium carbonate, and 200 parts of a 10 percent strength aqueous rosin solution which has been rendered alkaline with sodium hydroxide are added. The mixture is stirred for 4 hours at 95° C., brought back to pH 7, kept at 95° C. for a further 2 hours and cooled to 60° C., and the product is filtered off under suction, washed with water and dried at 60° C. 103 g of red pigment are obtained. The principal component is of the formula

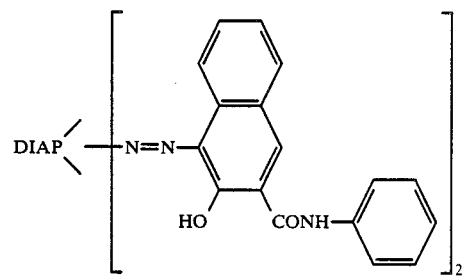

and the important secondary component is of the formula

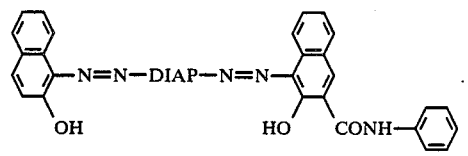

EXAMPLE 3

101 parts of dianthranilic acid piperazide in 600 parts of water are stirred with the addition of 0.6 part of the sodium salt of an alkylnaphthalenesulfonic acid. 180 parts by volume of concentrated hydrochloric acid are added, after which stirring is continued for 1 hour. Diazotization is carried out at 5° C. with 180 parts by volume of a 23 percent strength aqueous solution of sodium nitrite. The temperature is allowed to increase to 20° C. in the course of 3 hours, excess nitrite is destroyed with amidosulfonic acid, and the solution is run into a suspension of the coupling component, the suspension being prepared as described below. 104.4 parts of 3-methyl-1-phenylpyrazol-5-one are dissolved in 600 parts of water and 360 parts of 2N sodium hydroxide solution, the solution is cooled to 0° C. and precipitated with 1:1 glacial acetic acid/water, and 208 parts of a 10 percent strength rosin solution are then added, the said solution having been rendered alkaline with sodium hydroxide. Coupling is completed by bringing the pH to 4 by adding sodium acetate. The mixture is stirred overnight, after which it is filtered under suction and the residue is washed. The moist press cake is introduced into water, brought to pH 1.2 with dilute hydrochloric acid and stirred for 4 hours at 95° C. Filtration under suction, washing and drying in an oven at 60° C. give 272 parts of yellow pigment. The compound is of the formula

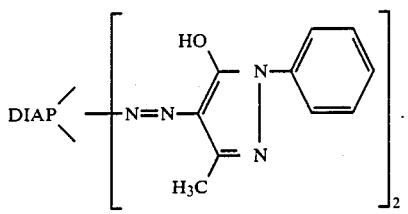

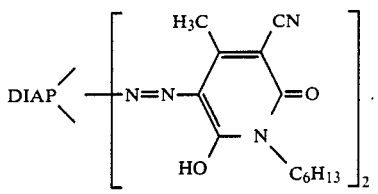

EXAMPLE 4

32.4 parts of dianthranilic acid piperazide in 120 parts of water are stirred with the addition of 0.2 part of the sodium salt of alkylnaphthalenesulfonic acid. After the addition of 50 parts by volume of 30 percent strength hydrochloric acid, a solution is formed for a short time and the hydrochloride is then precipitated. The mixture is cooled to 5° C., after which diazotization is carried out using 60 parts by volume of 23 percent strength aqueous sodium nitrite solution. Stirring is continued for 2 hours at room temperature, and the excess nitrite is destroyed with amidosulfonic acid. After filtration to effect clarification, a mixture of a solution of 30 parts of 3-cyano-2,6-dihydroxy-4-methylpyridine in 100 parts by volume of 2N sodium hydroxide solution, 600 parts by volume of water and 650 parts of a 10 percent strength aqueous alkaline rosin solution is added dropwise. Thereafter, the mixture is heated at 90° C. for three hours and the product is filtered off under suction, washed neutral with water and dried at 60° C. to give 123 g of a yellow pigment. The compound is of the formula

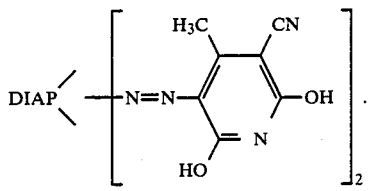

EXAMPLE 5

44 parts of dianthranilic acid piperazide in 150 parts of water are stirred with the addition of 0.2 part of the sodium salt of an alkylnaphthalenesulfonic acid. 150 parts by volume of concentrated hydrochloric acid are added, after which stirring is continued for one hour. The mixture is cooled to 5° C. and diazotization is then carried out using 81 parts by volume of a 23 percent strength aqueous sodium nitrite solution. Excess nitrite is destroyed with amidosulfonic acid. 63 parts of 3-cyano-N-hexyl-6-hydroxy-4-methylpyrid-2-one are dissolved in 750 parts of water with the addition of NaOH at 50° C., and the solution is filtered. This solution is cooled to room temperature, after which the diazonium salt solution is run in, the latter solution having been clarified by filtration. Stirring is continued for one hour at 50° C. and for one hour at 95° C., after which the product is filtered off under suction, washed neutral with hot water and dried at 70° C. to give 109 parts of a yellow pigment. The compound is of the formula

EXAMPLE 6

32.4 parts of dianthranilic acid piperazide in 120 parts of water are stirred with the addition of 0.2 part of the sodium salt of an alkylnaphthalenesulfonic acid. 75 parts by volume of concentrated hydrochloric acid are added, after which stirring is continued for one hour. Diazotization is carried out at room temperature with 64 parts by volume of a 23 percent strength aqueous sodium nitrite solution, after which excess nitrite is destroyed with amidosulfonic acid. 39 parts of N-butyl-3-cyano-6-hydroxy-4-methylpyrid-2-one and 1.6 parts of 3-cyano-2,6-dihydroxy-4-methylpyridine are dissolved in 300 parts of water with 8 parts of NaOH, and the solution is mixed with 152 parts of a 10 percent strength aqueous rosin solution. The diazonium salt solution is filtered into the mixture. Stirring is continued for half an hour, after which the pH is brought to 1.2, the mixture is stirred for 4 hours at 95° C. and the product is then filtered off under suction, washed and dried at 40° C. to give 92.5 parts of a yellow pigment. The principal component is of the formula

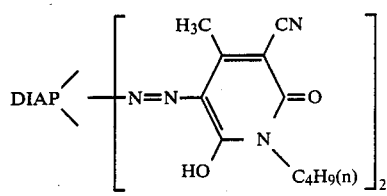

and the important secondary component is of the formula

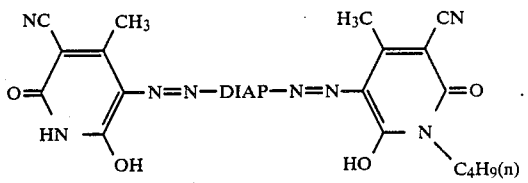

EXAMPLE 7

172 parts of piperazine and 968 parts of 5-bromoisatoic anhydride in 2000 parts of dioxane are stirred under reflux for 3 hours. The suspension is diluted with 500 parts of ethanol and filtered under suction, the filter cake is washed with ethanol and then with water and is then stirred in 2800 parts of 10 percent strength hydrochloric acid for 4 hours at 95° C. The product is filtered off under suction, washed neutral and dried at 70° C. Yield: 631 parts, bromine content: 31.6%.

53.6 parts of the resulting diazo component are boiled up in 500 parts of glacial acetic acid, the mixture is cooled to 5° C. and 58 parts of nitrosylsulfuric acid are then added dropwise. Stirring is continued for 3 hours at room temperature, the mixture is precipitated on ice, excess nitrite is destroyed by adding urea, and the mixture is run into the coupling component, which is prepared as prepared below. 15 parts of 2,6-dihydroxy-3-cyano-4-methylpyridine are dissolved in water which has been rendered alkaline, and precipitated at 0° C. by adding dilute hydrochloric acid. Coupling is carried out at 0° C. and pH 6. The pigment is filtered off under suction, washed, stirred in water at pH 10 for 4 hours at 98° C., filtered off under suction, washed neutral and dried to give 80 parts of a yellow pigment. The compound is of the formula

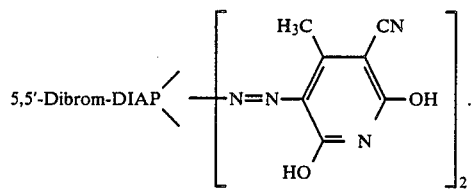

The other colorants may also be prepared by processes similar to those described:

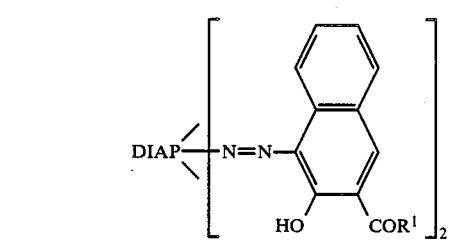

| Example No. | R¹ | Color |
|---|---|---|
| 8 | OCH₃ | red |
| 9 | OC₂H₅ | red |
| 10 | NH—C₆H₄—Cl (para) | red |
| 11 | NH—C₆H₄—Cl (ortho) | red |
| 12 | NH—C₆H₄—Cl (meta) | red |
| 13 | NH—C₆H₄—CH₃ (para) | red |
| 14 | NH—C₆H₄—CH₃ (ortho, H₃C) | red |

-continued

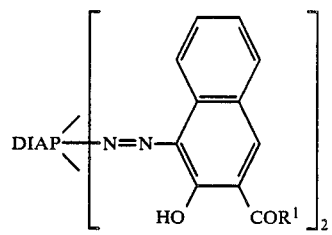

| Example No. | R¹ | Color |
|---|---|---|
| 15 | NH—C₆H₄—C₂H₅ (para) | red |
| 16 | NH—C₆H₄—C₂H₅ (ortho) | red |
| 17 | NH—C₆H₄—NHCOCH₃ (para) | red |
| 18 | NH—C₆H₄—OCH₃ (ortho) | red |
| 19 | NH—C₆H₄—OCH₃ (para) | red |
| 20 | NH—C₆H₄—OC₂H₅ (ortho) | red |
| 21 | NH—C₆H₄—OC₂H₅ (para) | red |
| 22 | NH—C₆H₃(CH₃)₂ (2,4-dimethyl) | red |
| 23 | NH—C₆H₃(Cl)(CH₃) (4-Cl, 3-CH₃) | red |

-continued

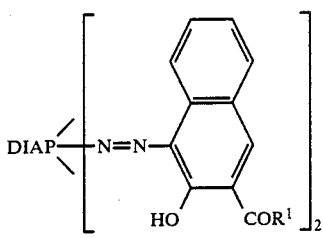

| Example No. | R¹ | Color |
|---|---|---|
| 24 | 2-methyl-5-chlorophenyl-NH | red |
| 25 | 2,5-dichlorophenyl-NH | red |
| 26 | 2,4-dichlorophenyl-NH | red |
| 27 | 2-methoxy-5-chlorophenyl-NH | red |
| 28 | 2-methyl-4-methoxyphenyl-NH | red |
| 29 | 2-methoxy-4-methoxyphenyl-NH | red |
| 30 | 2-methoxy-5-methoxyphenyl-NH | red |
| 31 | 2,4,5-trichlorophenyl-NH | red |

-continued

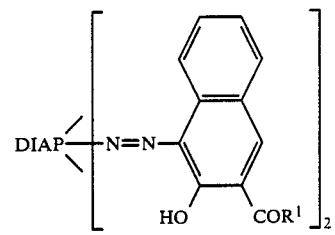

| Example No. | R¹ | Color |
|---|---|---|
| 32 | 2-methoxy-4-chloro-5-methoxyphenyl-NH | red |
| 33 | 2-methyl-4-chloro-5-methoxyphenyl-NH | red |
| 34 | 2-methyl-4-chloro-5-methoxyphenyl-NH (CH₃) | red |
| 35 | 2-methoxy-4-methoxy-5-chlorophenyl-NH | red |
| 36 | 1-naphthyl-NH | red |
| 37 | benzimidazolone-NH | red |
| 38 | 4-phthalimidophenyl-NH | red |

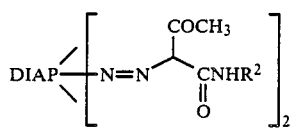
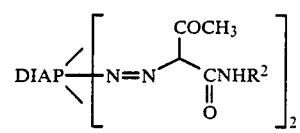

| Example No. | R² | Color |
|---|---|---|
| 39 | phenyl | yellow |
| 40 | 2-methylphenyl (H₃C) | yellow |
| 41 | 2,5-dimethylphenyl | yellow |
| 42 | 4-(NHCOCH₃)phenyl | yellow |
| 43 | 2-chlorophenyl | yellow |
| 44 | 3-methyl-4-chlorophenyl | yellow |
| 45 | 2-methoxyphenyl | yellow |
| 46 | 2-ethoxyphenyl | yellow |
| 47 | 4-methoxyphenyl | yellow |
| 48 | 2,5-diethoxyphenyl | yellow |
| 49 | 3,4-dimethoxyphenyl | yellow |
| 50 | 2,5-dichlorophenyl | yellow |
| 51 | 2,5-dimethoxyphenyl | yellow |
| 52 | 2,5-dimethoxy-4-chlorophenyl | yellow |
| 53 | 2-(methylthioimino)-4-ethoxyphenyl | yellow |
| 54 | 4-(NHCOC₆H₅)phenyl | yellow |
| 55 | 4-(phthalimido)phenyl | yellow |
| 56 | 2-(2-(p-tolyl)-4-hydroxyquinazolinyl) | yellow |
| 57 | 4,7-dimethyl-2-oxo-1,2-dihydroquinolinyl | yellow |

-continued
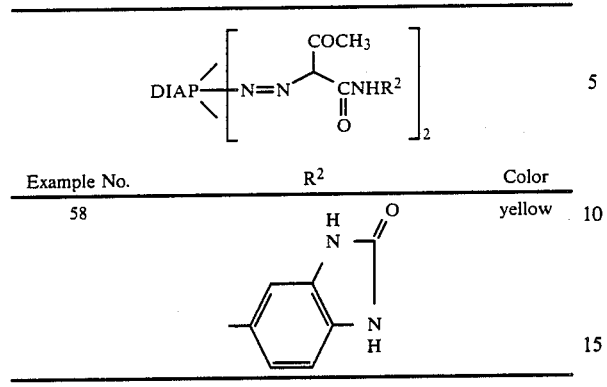
| Example No. | R² | Color |
|---|---|---|
| 58 | 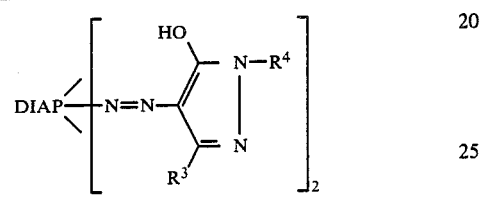 | yellow |
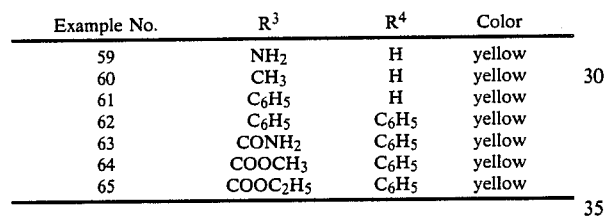
| Example No. | R³ | R⁴ | Color |
|---|---|---|---|
| 59 | NH₂ | H | yellow |
| 60 | CH₃ | H | yellow |
| 61 | C₆H₅ | H | yellow |
| 62 | C₆H₅ | C₆H₅ | yellow |
| 63 | CONH₂ | C₆H₅ | yellow |
| 64 | COOCH₃ | C₆H₅ | yellow |
| 65 | COOC₂H₅ | C₆H₅ | yellow |
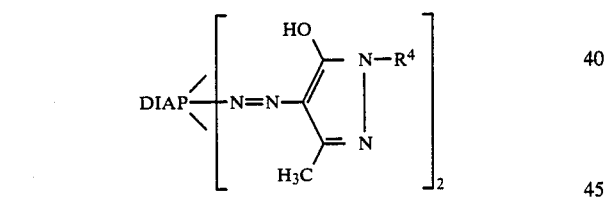
| Example No. | R⁴ | Color |
|---|---|---|
| 66 | 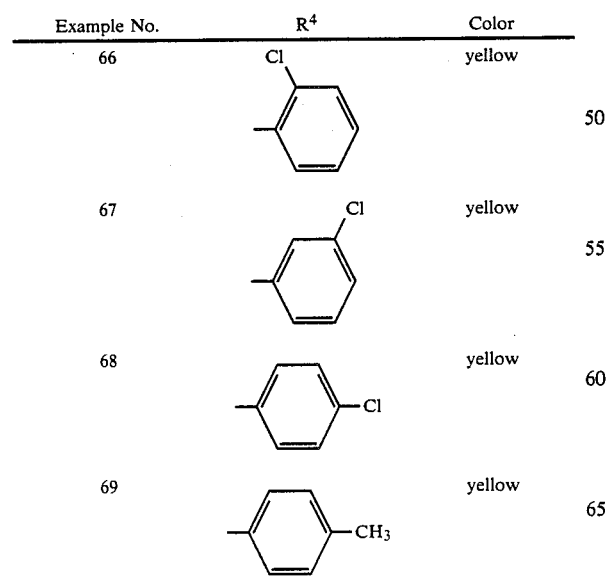 | yellow |
| 67 | | yellow |
| 68 | | yellow |
| 69 | | yellow |
-continued
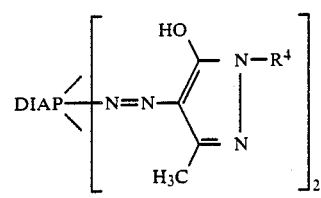
| Example No. | R⁴ | Color |
|---|---|---|
| 70 | 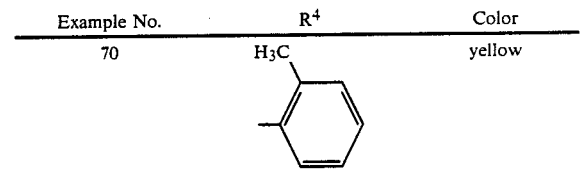 | yellow |
| 71 | 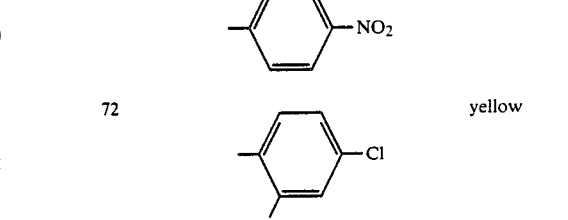 | yellow |
| 72 | 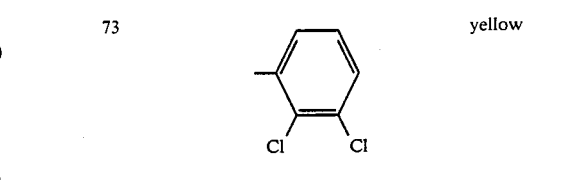 | yellow |
| 73 | 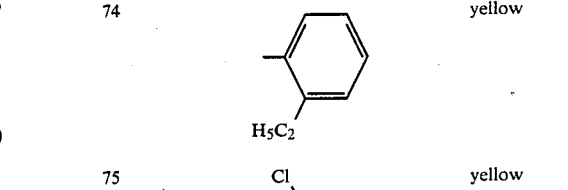 | yellow |
| 74 | 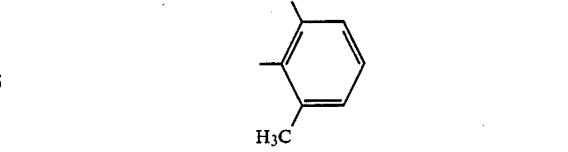 | yellow |
| 75 | 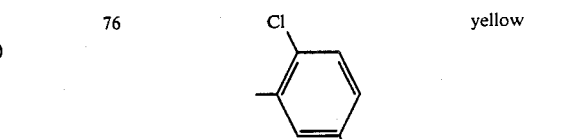 | yellow |
| 76 | 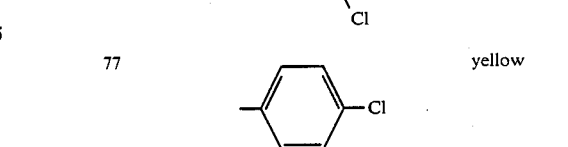 | yellow |
| 77 | | yellow |
| 78 | 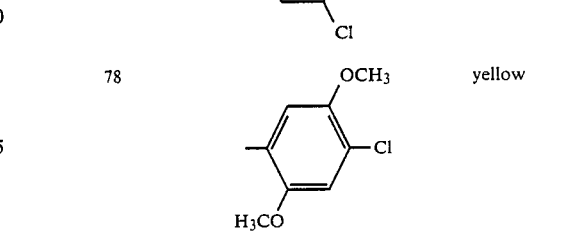 | yellow |

-continued

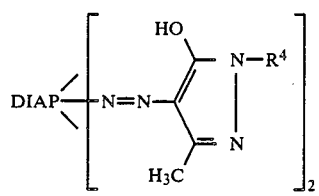

| Example No. | R⁴ | Color |
|---|---|---|
| 79 | 3-NO₂-phenyl | yellow |
| 80 | 4-OCH₃-phenyl | yellow |
| 81 | 2-pyridyl | yellow |
| 82 | 4-pyridyl | yellow |

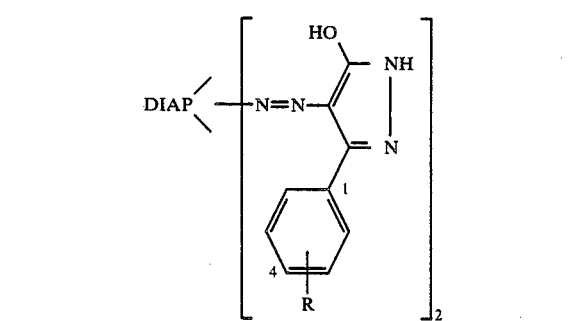

| Example No. | R | Color |
|---|---|---|
| 83 | H | yellow |
| 84 | 4-Cl | yellow |
| 85 | 2,4-Cl₂ | yellow |
| 86 | 4-CH₃ | yellow |
| 87 | 4-NO₂ | yellow |
| 88 | 4-OCH₃ | yellow |
| 89 | 4-NHCOCH₃ | yellow |
| 90 | 4-NHCOC₆H₅ | yellow |
| 91 | 2,5-(OCH₃)₂ | yellow |
| 92 | 2,5-Cl₂ | yellow |

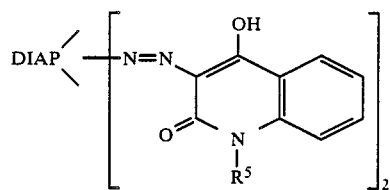

| Example No. | R⁵ | Color |
|---|---|---|
| 93 | H | yellow |
| 94 | $CH_3$ | yellow |
| 95 | $C_2H_5$ | yellow |
| 96 | $C_3H_7(n)$ | yellow |
| 97 | $CH(CH_3)_2$ | yellow |
| 98 | $C_4H_9(n)$ | yellow |

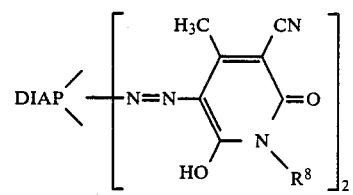

| Example No. | R⁸ | Color |
|---|---|---|
| 99 | —$CH_3$ | yellow |
| 100 | —$C_2H_5$ | yellow |
| 101 | —$C_3H_7(n)$ | yellow |
| 102 | —$CH(CH_3)_2$ | yellow |
| 103 | —$C_4H_9(n)$ | yellow |
| 104 | —$CH_2CH(CH_3)_2$ | yellow |
| 105 | —$CH(CH_3)C_2H_5$ | yellow |
| 106 | —$C_5H_{11}(n)$ | yellow |
| 107 | —$CH(C_2H_5)_2$ | yellow |
| 108 | —$C_2H_4CH(CH_3)_2$ | yellow |
| 109 | —$CH_2C(CH_3)_3$ | yellow |
| 110 | —$CH(CH_3)CH(CH_3)_2$ | yellow |
| 111 | —$C(CH_3)_2C_2H_5$ | yellow |
| 112 | —$CH_2CH(C_2H_5)C_4H_9$ | yellow |
| 113 | —$CH_2$-(2-furyl) | yellow |
| 114 | —$CH_2$-(2-tetrahydrofuryl) | yellow |

-continued

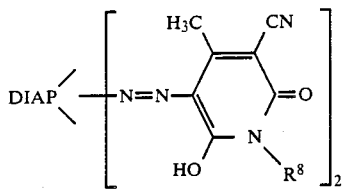

| Example No. | R⁸ | Color |
|---|---|---|
| 115 | cyclohexyl (H) | yellow |
| 116 | 3-methylcyclohexyl | yellow |
| 117 | cyclopentyl | yellow |
| 118 | $-CH_2-C_6H_5$ | yellow |
| 119 | $-CH(CH_3)C_6H_5$ | yellow |
| 120 | $-CH(CH_3)C_2H_4C_6H_5$ | yellow |
| 121 | $-C_6H_5$ | yellow |
| 122 | $-C_8H_{17}(n)$ | yellow |
| 123 | $-C_{10}H_{21}$ | yellow |
| 124 | $-C_{12}H_{25}$ | yellow |
| 125 | $-C_{14}H_{29}$ | yellow |
| 126 | $-C_{16}H_{33}$ | yellow |
| 127 | $-C_{18}H_{37}$ | yellow |
| 128 | $-C_{20}H_{41}$ | yellow |
| 129 | $-C_7H_{15}$ | yellow |
| 130 | $-C_{13}H_{17}$ (isomer mixture) | yellow |
| 131 | $-C_9H_{19}$ (isomer mixture) | yellow |
| 132 | $-C_{18}H_{35}$ | yellow |
| 133 | $-C_{16}H_{31}$ | yellow |
| 134 | $-C_2H_4OH$ | yellow |
| 135 | $-C_2H_4OCH_3$ | yellow |
| 136 | $-C_2H_4OC_2H_5$ | yellow |
| 137 | $-C_3H_6OH$ | yellow |
| 138 | $-C_3H_6OC_2H_4OH$ | yellow |
| 139 | $-CH_2CH(CH_3)OH$ | yellow |
| 140 | $-C_3H_6OC_2H_5$ | yellow |
| 141 | $-CH(C_2H_5)CH_2OH$ | yellow |
| 142 | $-CH(CH_3)CH_2OH$ | yellow |
| 143 | $-C_3H_6OCH_3$ | yellow |
| 144 | $-C_3H_6OC_9H_{19}(iso)$ | yellow |
| 145 | $-CH_2C(CH_3)_2CH_2OH$ | yellow |

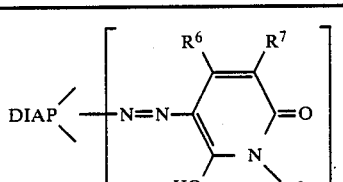

| Example No. | R⁶ | R⁷ | R⁸ | Color |
|---|---|---|---|---|
| 146 | $CH_3$ | $CONH_2$ | $-H$ | yellow |
| 147 | $CH_3$ | $CONH_2$ | $-CH_3$ | yellow |
| 148 | $CH_3$ | $CONH_2$ | $-C_2H_5$ | yellow |
| 149 | $CH_3$ | $CONH_2$ | $-C_3H_7(n)$ | yellow |

-continued

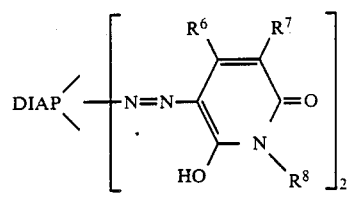

| Example No. | R⁶ | R⁷ | R⁸ | Color |
|---|---|---|---|---|
| 150 | $CH_3$ | $CONH_2$ | $-CH(CH_3)_2$ | yellow |
| 151 | $CH_3$ | $CONH_2$ | $-C_4H_9(n)$ | yellow |
| 152 | $CH_3$ | $CONH_2$ | $-CH_2CH_2CH(CH_3)_2$ | yellow |
| 153 | $CH_3$ | $CONH_2$ | $-CH(CH_3)C_2H_5$ | yellow |
| 154 | $CH_3$ | $CONH_2$ | $-C_5H_{11}(n)$ | yellow |
| 155 | $CH_3$ | $CONH_2$ | $-C_2H_5CH(CH_3)$ | yellow |
| 156 | $CH_3$ | $CONH_2$ | $-C_6H_{13}(n)$ | yellow |
| 157 | $CH_3$ | $CONH_2$ | $-C_8H_{17}(n)$ | yellow |
| 158 | $CH_3$ | $CONH_2$ | $-CH_2CH(C_2H_5)C_4H_9$ | yellow |
| 159 | $CH_3$ | H | $-H$ | yellow |
| 160 | $CH_3$ | H | $-CH_3$ | yellow |
| 161 | $CH_3$ | H | $-C_2H_5$ | yellow |
| 162 | $CH_3$ | H | $-C_3H_7(n)$ | yellow |
| 163 | $CH_3$ | H | $-CH(CH_3)_2$ | yellow |
| 164 | $CH_3$ | H | $-C_4H_9(n)$ | yellow |
| 165 | $CH_3$ | H | $-C_6H_{13}$ | yellow |
| 166 | $CH_3$ | $COCH_3$ | $-H$ | yellow |
| 167 | $CH_3$ | $COCH_3$ | $-CH_3$ | yellow |
| 168 | $CH_3$ | $COCH_3$ | $-C_2H_5$ | yellow |
| 169 | $CH_3$ | $COCH_3$ | $-C_3H_7(n)$ | yellow |
| 170 | $CH_3$ | $COCH_3$ | $-CH(CH_3)_2$ | yellow |
| 171 | $CH_3$ | $COCH_3$ | $-C_4H_9(n)$ | yellow |
| 172 | $CH_3$ | $COCH_3$ | $-C_6H_{13}$ | yellow |
| 173 | $CONH_2$ | H | $-H$ | yellow |
| 174 | OH | CN | $-H$ | yellow |
| 175 | OH | $CONH_2$ | $-H$ | yellow |
| 176 | H | CN | $-H$ | yellow |
| 177 | H | CN | $-CH_3$ | yellow |
| 178 | H | CN | $-C_2H_5$ | yellow |
| 179 | H | CN | $-C_3H_7$ | yellow |

-continued

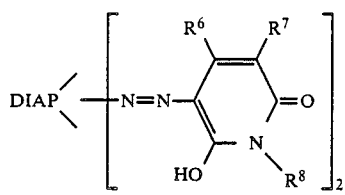

| Example No. | R⁶ | R⁷ | R⁸ | Color |
|---|---|---|---|---|
| 180 | H | CN | —CH(CH₃)₂ | yellow |
| 181 | H | CN | —C₄H₉ | yellow |
| 182 | H | COCH₃ | —H | yellow |
| 183 | H | COCH₃ | —CH₃ | yellow |
| 184 | H | COCH₃ | —C₂H₅ | yellow |
| 185 | H | COCH₃ | —C₃H₇ | yellow |
| 186 | H | COCH₃ | —CH(CH₃)₂ | yellow |
| 187 | H | COCH₃ | —C₄H₉ | yellow |
| 188 | H | CONH₂ | —H | yellow |
| 189 | H | CONH₂ | —CH₃ | yellow |
| 190 | H | CONH₂ | —C₂H₅ | yellow |
| 191 | H | CONH₂ | —C₃H₇ | yellow |
| 192 | H | CONH₂ | —CH(CH₃)₂ | yellow |
| 193 | H | CONH₂ | —C₄H₉ | yellow |

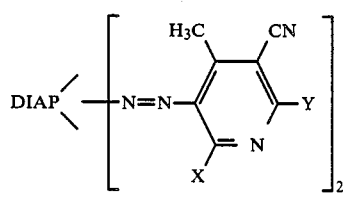

| Example No. | X | Y | Color |
|---|---|---|---|
| 194 | HO | NH₂ | yellow |
| 195 | HO | NHCH₃ | yellow |
| 196 | NH₂ | NH₂ | orange |
| 197 | NHCH₃ | NHCH₃ | orange |
| 198 | NH₂ | NHCH₃ | orange |
| 199 | NHC₂H₅ | NHC₂H₅ | orange |
| 200 | NH₂ | NHC₂H₅ | orange |
| 201 | NHC₆H₅ | NHC₆H₅ | orange |
| 202 | NH₂ | NHC₆H₅ | orange |

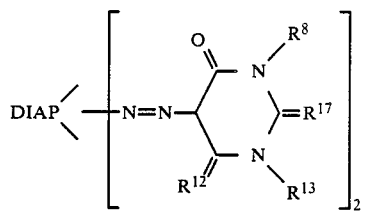

| Example No. | R⁸ | R¹² | R¹³ | R¹⁷ | Color |
|---|---|---|---|---|---|
| 203 | H | O | H | O | yellow |
| 204 | H | NH | H | O | yellow |
| 205 | H | NH | H | NH | yellow |
| 206 | H | NH | H | NCN | yellow |
| 207 | H | O | H | NH | yellow |
| 208 | H | O | CH₃ | O | yellow |
| 209 | H | O | C₂H₅ | O | yellow |
| 210 | CH₃ | O | CH₃ | O | yellow |
| 211 | CH₃ | O | C₆H₅ | O | yellow |
| 212 | C₆H₅ | O | C₆H₅ | O | yellow |
| 213 | H | O | C₆H₅ | O | yellow |
| 214 | CH₃ | O | CH₃ | NH | yellow |
| 215 | H | O | —C₆H₄—Cl | O | yellow |
| 216 | H | O | —C₆H₄—CH₃ | O | yellow |

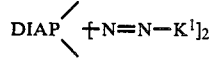

| Example No. | K¹H | Color |
|---|---|---|
| 217 |  | red |
| 218 |  | yellow |
| 219 |  | yellow |
| 220 |  | yellow |
| 221 | (benzothiazole-CH₂CN) | yellow |
| 222 | (NH indole-CH₂CN) | yellow |

-continued $$DIAP\diagup(-N=N-K^1)_2$$

| Example No. | K¹H | Color |
|---|---|---|
| 223 | [chromone-type structure with O, OH] | yellow |
| 224 | [benzimidazole with NH, N, CH₂COCH₃] | yellow |

[Structure: DIAP–N=N– attached to phenyl ring with C=O, N-R¹⁴, HO group, shown as [...]₂]

| Example No. | R¹⁴ | Color |
|---|---|---|
| 225 | H | yellow |
| 226 | CH₃ | yellow |
| 227 | C₂H₅ | yellow |
| 228 | C₃H₇ | yellow |
| 229 | CH(CH₃)₂ | yellow |
| 230 | C₄H₉ | yellow |
| 231 | NHC₆H₅ | yellow |
| 232 | NHC(O)C₆H₅ | yellow |
| 233 | [NHC(O)-phenyl-OH structure] | yellow |

[Structure: DIAP with N=N linker to pyrazole-fused system with R¹⁶, NH, N, C=O, ring A with positions 5,7,8, shown as [...]₂]

| Example No. | A | R¹⁶ | Color |
|---|---|---|---|
| 234 | 7-Cl | CH₃ | yellow |
| 235 | 7-Br | CH₃ | yellow |
| 236 | 5,7-Cl₂ | CH₃ | yellow |
| 237 | 7-Cl, 5-Br | CH₃ | yellow |
| 238 | 5,7-Br₂ | CH₃ | yellow |
| 239 | 5-Cl | CH₃ | yellow |
| 240 | 7-Br, 5-Cl | CH₃ | yellow |
| 241 | 8-Cl | CH₃ | yellow |
| 242 | 7-Cl | C₆H₅ | yellow |
| 243 | 7-Br | C₆H₅ | yellow |
| 244 | 5-Cl | C₆H₅ | yellow |
| 245 | 5,7-Cl₂ | C₆H₅ | yellow |
| 246 | 5,7-Br₂ | C₆H₅ | yellow |
| 247 | 8-Cl | C₆H₅ | yellow |
| 248 | H | CH₃ | yellow |
| 249 | H | C₆H₅ | yellow |

[Structure with CH₃, HN, N=N, C=O, ring A, piperazine, shown as [...]₂]

| Example No. | A | Color |
|---|---|---|
| 250 | 5-Cl | yellow |
| 251 | 5-Br | yellow |
| 252 | 3,5-Cl₂ | yellow |
| 253 | 3,5-Br | yellow |
| 254 | 3-Cl, 5-Br | yellow |
| 255 | 3-Br, 5-Cl | yellow |

[Structure with NC, CH₃, O=, N-R⁸, OH, N=N, C=O, ring A, piperazine, shown as [...]₂]

| Example No. | A | R⁸ | Color |
|---|---|---|---|
| 256 | 5-Cl | H | yellow |
| 257 | 5-Cl | CH₃ | yellow |

-continued

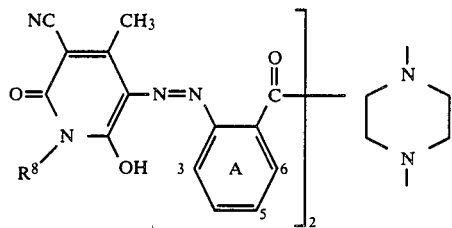

| Example No. | A | R[8] | Color |
|---|---|---|---|
| 258 | 5-Cl | $C_2H_5$ | yellow |
| 259 | 5-Cl | $C_3H_7$ | yellow |
| 260 | 5-Cl | CH(CH$_3$)$_2$ | yellow |
| 261 | 5-Cl | $C_4H_9$ | yellow |
| 262 | 5-Br | $CH_3$ | yellow |
| 263 | 5-Br | $C_2H_5$ | yellow |
| 264 | 5-Br | $C_3H_7$ | yellow |
| 265 | 5-Br | CH(CH$_3$)$_2$ | yellow |
| 266 | 5-Br | $C_4H_9$ | yellow |
| 267 | 5-NO$_2$ | H | yellow |
| 268 | 5-NO$_2$ | $CH_3$ | yellow |
| 269 | 5-NO$_2$ | $C_2H_5$ | yellow |
| 270 | 5-NO$_2$ | $C_3H_7$ | yellow |
| 271 | 5-NO$_2$ | CH(CH$_3$)$_2$ | yellow |
| 272 | 5-NO$_2$ | $C_4H_9$ | yellow |
| 273 | 3,5-Br$_2$ | H | yellow |
| 274 | 3,5-Br$_2$ | $CH_3$ | yellow |
| 275 | 3,5-Br$_2$ | $C_2H_5$ | yellow |
| 276 | 3,5-Br$_2$ | $C_3H_7$ | yellow |
| 277 | 3,5-Br$_2$ | CH(CH$_3$)$_2$ | yellow |
| 278 | 3,5-Br$_2$ | $C_4H_9$ | yellow |
| 279 | 3,5-Cl$_2$ | H | yellow |
| 280 | 3,5-Cl$_2$ | $CH_3$ | yellow |
| 281 | 3,5-Cl$_2$ | $C_2H_5$ | yellow |
| 282 | 3,5-Cl$_2$ | $C_3H_7$ | yellow |
| 283 | 3,5-Cl$_2$ | CH(CH$_3$)$_2$ | yellow |
| 284 | 3,5-Cl$_2$ | $C_4H_9$ | yellow |
| 285 | 3-Cl, 5-Br | H | yellow |
| 286 | 3-Cl, 5-Br | $CH_3$ | yellow |
| 287 | 3-Cl, 5-Br | $C_2H_5$ | yellow |
| 288 | 3-Cl, 5-Br | $C_3H_7$ | yellow |
| 289 | 3-Cl, 5-Br | CH(CH$_3$)$_2$ | yellow |
| 290 | 3-Cl, 5-Br | $C_4H_9$ | yellow |
| 291 | 3-Br, 5-Cl | H | yellow |
| 292 | 3-Br, 5-Cl | $CH_3$ | yellow |

-continued

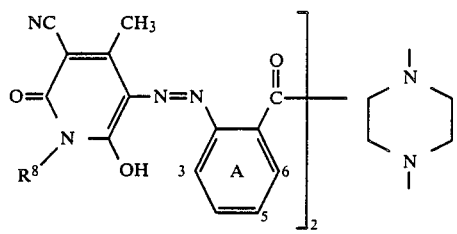

| Example No. | A | R[8] | Color |
|---|---|---|---|
| 293 | 3-Br, 5-Cl | $C_2H_5$ | yellow |
| 294 | 3-Br, 5-Cl | $C_3H_7$ | yellow |
| 295 | 3-Br, 5-Cl | CH(CH$_3$)$_2$ | yellow |
| 296 | 3-Br, 5-Cl | $C_4H_9$ | yellow |
| 297 | 6-Cl | H | yellow |
| 298 | 6-Cl | $CH_3$ | yellow |
| 299 | 6-Cl | $C_2H_5$ | yellow |
| 300 | 6-Cl | $C_3H_7$ | yellow |
| 301 | 6-Cl | CH(CH$_3$)$_2$ | yellow |
| 302 | 6-Cl | $C_4H_9$ | yellow |

EXAMPLE 303

162 parts of dianthranilic acid piperazide in 500 parts of water are stirred for a few hours with the addition of 0.5 part of a sodium alkylnaphthalenesulfonate. 275 ml of concentrated HCl are added, after which stirring is continued for ½ hour, ice is then added and diazotization is effected with 310 parts by volume of 23 percent strength aqueous sodium nitrite solution at from 0° to 5° C. After 1½ hours, excess nitrite is destroyed with amidosulfonic acid and the solution is filtered.

41.4 parts of 3-cyano-6-hydroxy-1,4-dimethylpyrid-2-one are dissolved in a mixture of 100 parts of 2N sodium hydroxide solution and 600 parts of water with heating. 500 parts of a 10 percent strength aqueous rosin solution which has been rendered alkaline with sodium hydroxide are added at room temperature, and a solution of 2.9 parts of 3-cyano-6-hydroxy-4-methyl-1-(γ-trimethylammoniumpropyl)pyrid-2-one in 10 parts of glacial acetic acid is added dropwise. The diazonium salt solution is run into 85% of this suspension, while stirring thoroughly, and the mixture is titrated with the remaining 15% of the coupling component in the course of ½ hour until a small excess of diazo component is present. After 10 minutes, the pH is brought to 12 with 50 percent strength aqueous sodium hydroxide solution, stirring is continued for 5 minutes and the mixture is acidified with 30 parts of formic acid. The pH is then brought to 9 with sodium hydroxide solution and the mixture is stirred for 4 hours at 98° C. The pH is then brought to 5 with dilute hydrochloric acid, the mixture is cooled to 50° C. and the product is filtered off under suction, washed salt-free with water and dried at 50° C. to give 117 parts of a yellow pigment. The principal component is of the formula

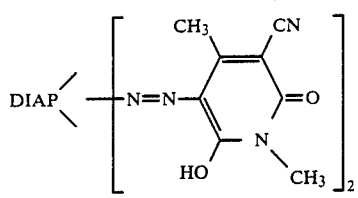

and the secondary components are of the formulae

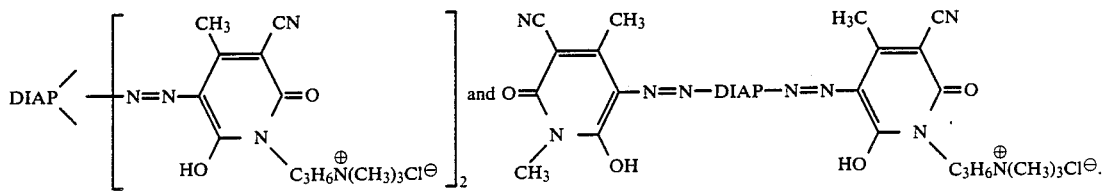

The secondary coupling components stated in the table below can be used in a similar manner in the preparation of the pigments, also in combination with other principal coupling components. However, it is also possible to prepare the pure colorants DIAP→(secondary coupling component 1, secondary coupling component 2) and to add them before or after the principal coupling reaction which leads to the pigment.

| Example No. | R | Color |
|---|---|---|
| 304 | $C_2H_4N(CH_3)_2$ | yellow |
| 305 | $C_2H_4N(C_2H_5)_2$ | yellow |
| 306 | $C_2H_4N(CHCH_3)_2$<br>     \|<br>    $CH_3$ | yellow |
| 307 | $C_2H_4N(C_4H_9)_2$ | yellow |
| 308 | $C_2H_4N$⟨pyrrolidine⟩ | yellow |
| 309 | $C_3H_6N(CH_3)_2$ | yellow |
| 310 | $C_3H_6N(C_2H_5)_2$ | yellow |
| 311 | $C_3H_6N(C_3H_7)_2$ | yellow |
| 312 | $C_3H_6N(CH(CH_3)_2)_2$ | yellow |
| 313 | $C_3H_6N(C_4H_9)_2$ | yellow |
| 314 | $C_3H_6NH$—cyclohexyl | yellow |
| 315 | $C_3H_6NH$—pyrrolyl | yellow |

-continued

| Example No. | R | Color |
|---|---|---|
| 316 | $C_3H_6N$—morpholine | yellow |
| 317 | $C_3H_6N$—pyrrolidine | yellow |
| 318 | $C_3H_6N$—piperidine | yellow |
| 319 | $C_3H_6NH$—$CH_2$—phenyl | yellow |
| 320 | $C_3H_6NHC_{12}H_{25}$ | yellow |
| 321 | $C_3H_6NH$—kokos<br>($C_8, C_{10}, C_{12}, C_{12}, C_{16}, C_{18}$) | yellow |
| 322 | $C_3H_6NH$—Talgfett<br>($C_{14}, C_{16}, C_{18}$) | yellow |
| 323 | $C_3H_6NH$—Oleyl<br>($C_{14}, C_{16}, C_{18}$) | yellow |
| 324 | $C_3H_6\overset{\oplus}{N}(CH_3)_3$ | yellow |
| 325 | $C_3H_6\overset{\oplus}{N}(CH_3)_2(C_2H_4OH)$ | yellow |
| 326 | $C_3H_6\overset{\oplus}{N}(CH_3)(C_2H_5)_2$ | yellow |
| 327 | $C_3H_6$—$\overset{\oplus}{N}(CH_3)$—morpholine | yellow |
| 328 | $C_3H_6N$—N-methylimidazolium | |

EXAMPLES OF USE (a) Surface coating 10 parts of the colorant obtained as described in Example 20 and 95 parts of a baking finish mixture containing 70% of coconut alkyd resin (60% strength solution in xylene) and 30% of melamine resin (roughly 55% strength solution in butanol/xylene) are milled in an attrition mill. After application and baking for 30 minutes at 120° C., red full-shade coatings possessing good depth and lightfastness are obtained. If titanium dioxide is added, red white reductions are produced.

If the colorants described in Examples 1-302 are used, some of the coatings obtained have good depth.

(b) Plastic (soft PVC)

0.05 part of a colorant obtained as described in Example 99 and 50 parts of a mixture of 65 parts of PVC powder, 36 parts of di-ethylhexyl phthalate and 2 parts of dibutyltin bis-(hexylthioglycolate) are homogenized on a roll mill at 150°-160° C. for about 8 minutes, milled to give hides, and polished on a calender. Yellow sheets having good lightfastness and fastness to plasticizers are obtained. If titanium oxide is added during incorporation, yellow reductions of good depth are obtained.

If the pigment dyes obtained as described in Examples 1-302 are used, similar colorations are obtained.

(c) Printing ink 8 parts of the pigment dye obtained as described in Example 1, 40 parts of a rosin modified with phenol/-formaldehyde, and from 55 to 65 parts of toluene are mixed thoroughly in a dispersing unit. A yellow toluene-based gravure printing ink is obtained. The prints obtained with this ink possess a good depth.

If the colorants of Examples 2-302 are used, similar results are obtained.

We claim:

1. A sulfo-free compound of the formula

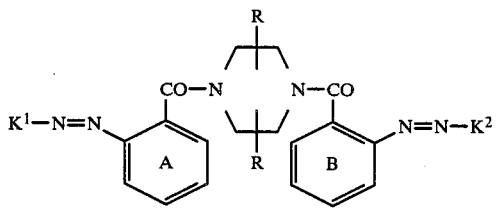

where

R is hydrogen or $C_1$-$C_4$-alkyl and $K^1$ and $K^2$ independently of one another are a radical of a coupling component, and the rings A and B are unsubstituted, or are monosubstituted or polysubstituted by fluorine, chlorine, bromine, nitro, methyl, trifluoromethyl, ethyl, acetyl, benzoyl, $COOCH_3$, $COOC_2H_5$, $COOC_3H_7$, $COOCH(CH_3)_2$, $COOC_4H_9$, $COOC_6H_5$, $COOC_6H_{13}$, $COOC_8H_{17}$, $COOC_2H_4OCH_3$, $COOC_2H_4OC_2H_5$, $COOCH_2C_6H_5$, $CONH_2$, $CONHCH_3$, $CONHC_2H_5$, $CONHC_3H_7$, $CONHC_4H_9$, $CONHCH(CH_3)_2$, $CONHCH_2C_6H_5$, $CONHC_6H_5$, $CONHC_6H_4Cl$, $CONHC_6H_3Cl_2$, $CONHC_6H_2Cl_3$, $CONHC_6H_4Br$, $CONHC_6H_4OCH_3$, $CONHC_6H_4CH_3$, $CONHC_6H_4OC_2H_5$, $CONHC_6H_3Cl(OCH_3)$, $CONHC_6H_4NHCOCH_3$, $CONHC_6H_4NHCOC_6H_5$, $CONHNHCOC_6H_5$, $CONHNHCOC_6H_4Cl$, $CONHNHCOC_6H_4CH_3$, $SO_2NH_2$, $SO_2NHCH_3$, $SO_2NHC_2H_5$, $SO_2NHC_3H_7$, $SO_2NHC_4H_9$, $SO_2NHCH(CH_3)_2$, $SO_2NHCH_2C_6H_5$, $SO_2NHC_6H_5$, $SO_2NHC_6H_4Cl$, $SO_2NHC_6H_3Cl_2$, $SO_2NHC_6H_2Cl_3$, $SO_2NHC_6H_4Br$, $SO_2NHC_6H_4OCH_3$, $SO_2NHC_6H_4CH_3$, $SO_2NHC_6H_4OC_2H_5$, $SO_2NHC_6H_3Cl(OCH_3)$, $SO_2NHC_6H_4NHCOCH_3$, $SO_2NHC_6H_4NHCOC_6H_5$, $SO_2NHNHCOC_6H_5$, $SO_2NHNHCOC_6H_4Cl$, $SO_2NHNHCOC_6H_4CH_3$, $SO_2OC_6H_5$, $SO_2OC_6H_4CH_3$, $SO_2OC_6H_4Cl$, $SO_2OC_6H_4Br$, $SO_2OC_6H_4OCH_3$, $SO_2OC_6H_4NHCOCH_3$, $SO_2OC_6H_3Cl_2$, $SO_2C_6H_5$, $SO_2C_6H_4Cl$, $NHCOCH_3$, $NHCOC_2H_5$, $NHCOC_6H_5$, $NHCONH_2$, $NHCON(CH_3)_2$, $NHCONHC_6H_5$, $C_1$-$C_4$-alkylsulfonyl or cyano.

2. A compound as claimed in claim 1 of the formula

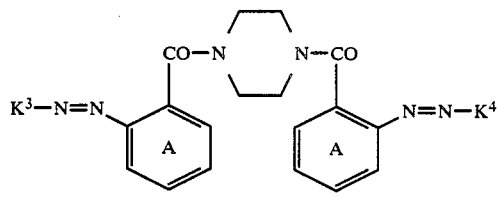

where $K^3$ and $K^4$ independently of one another are each a radical of the formulae

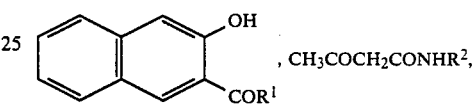

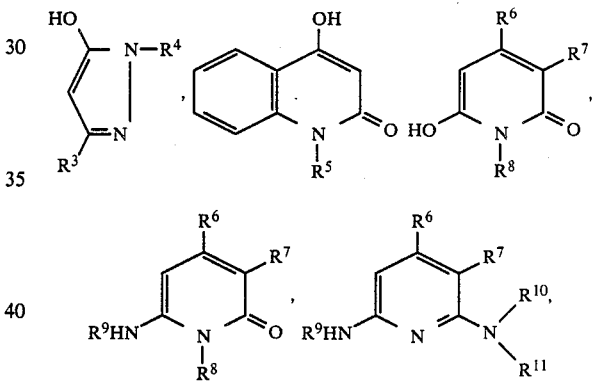

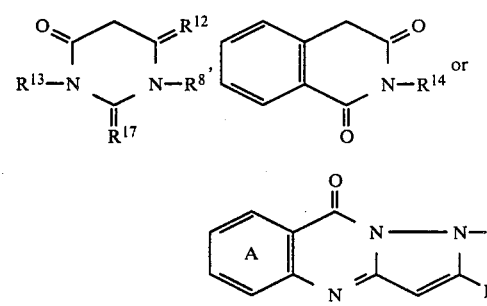

where $R^1$ is $C_1$-$C_4$-alkoxy, phenoxy which is unsubstituted or is substituted by chlorine, or arylamino which is unsubstituted or is substituted by chlorine, bromine, methyl, methoxy, ethoxy, nitro, cyano, acetamino, carbamyl, or sulfamyl;

$R^2$ is aryl which is unsubstituted or is substituted by chlorine, bromine, methyl, methoxy, ethoxy, nitro, cyano, acetamino, carbamyl, or sulfamyl;

$R^3$ is hydrogen, methyl, carboxyl, $C_1$-$C_8$-alkoxycarbonyl, carbamyl or the substituents stated for $R^2$;

$R^4$ is hydrogen or the substituents stated for $R^2$, $R^5$ is hydrogen or $C_1$–$C_{13}$-alkyl;

$R^6$ is hydrogen, hydroxyl, amino or $C_1$–$C_4$-alkyl;

$R^7$ is hydrogen, cyano, carbamyl, acetyl or benzoyl;

$R^8$ and $R^{13}$ independently of one another are each hydrogen, $C_1$–$C_{22}$ alkyl which is unsubstituted or substituted by hydroxy, methoxy, cyano, carbomethoxy, carboethoxy, acetoxy, ethoxycarbonyl, acetylamino, phenoxycarbonyloxy, phenylaminocarbonyloxy, butylaminocarbonyloxy, phenyl, or sulfo; phenyl or benzyl;

$R^9$, $R^{10}$ and $R^{11}$ independently of one another are each hydrogen or $C_1$–$C_8$ alkyl which is unsubstituted, or $C_2$–$C_6$-alkyl which is substituted by hydroxyl, cyano, alkoxy of 1 to 8 carbon atoms, phenoxy, phenoxyethoxy or benzyloxy; cyclohexyl, or phenyl, or $R^{10}$ and $R^{11}$ together with the nitrogen form a 5-membered or 6-membered heterocyclic ring;

$R^{12}$ and $R^{17}$ independently of one another are each oxygen, iminio or cyanoimino;

$R^{14}$ is a radical $R^8$, amino, $C_1$–$C_8$ alkanoylamino, or benzoylamino which is unsubstituted or is monosubstituted or disubstituted by hydroxyl, chlorine, methyl, methoxy, acetylamino, nitro or amino;

$R^{15}$ is hydrogen or phenyl which is unsubstituted or is monosubstituted, disubstituted or trisubstituted by chloro, bromo, methoxy or methyl;

$R^{16}$ is hydroxyl, methyl, a carboxylic $C_1$–$C_2$-alkyl ester group, a member selected from the group consisting of $NHCOCH_3$, $NHCOC_2H_5$, $NHCOC_3H_7$, $NHCOC_6H_5$, $NHCOC_6H_4Cl$, $NHCOC_6H_3Cl_2$, $NHCOC_6H_4Br$, $NHCOC_6H_4OCH_3$, $NHCONH_2$, $NHCONHC_6H_5$ and $NHCOCONHC_6H_5$; or a radical $R^{15}$, and the ring A is unsubstituted or is substituted in the stated manner and the phenylene radicals A are unsubstituted or are monosubstituted or polysubstituted by chlorine, bromine or nitro, the substituents being identical or different in the case of polysubstitution.

3. A compound as claimed in claim 2, wherein $R^1$ is $NHC_6H_5$ which is unsubstituted or is monosubstituted or polysubstituted by chlorine, bromine, methyl, methoxy, ethoxy, nitro, cyano, acetamino, carbamyl or sulfamyl, the substituents being identical or different in the case of polysubstitution;

$R^2$ is phenyl which is unsubstituted or is monosubstituted or polysubstituted by chlorine, bromine, methyl, methoxy, ethoxy, nitro, cyano, acetamino, carbamyl or sulfamyl, the substituents being identical or different in the case of polysubstitution;

$R^3$ is hydrogen, methyl, $C_1$–$C_4$-alkoxycarbonyl, carbamyl, $C_1$–$C_4$-alkylaminocarbonyl or the radicals given for $R^2$;

$R^4$ is hydrogen or the radicals given for $R^2$;

$R^5$ is hydrogen or $C_1$–$C_8$-alkyl;

$R^6$ is hydrogen, cyano, carbamyl, acetyl or benzoyl;

$R^8$ and $R^{13}$ independently of one another are each hydrogen, $C_1$–$C_{22}$ alkyl, benzyl or a radical $R^2$;

$R^9$, $R^{10}$ and $R^{11}$ independently of one another are each hydrogen, $C_1$–$C_8$ alkyl, cyclohexyl, benzyl or a radical $R^2$, or $R^{10}$ and $R^{11}$ together with the nitrogen form a 5-membered or 6-membered heterocyclic ring;

$R^{12}$ and $R^{17}$ independently of one another are each oxygen, imino or cyanoimino;

$R^{14}$ is a radical $R^8$ or $C_1$–$C_8$ alkanoylamino or benzoylamino which is unsubstituted or is substituted by hydroxyl, chlorine, methyl, methoxy, acetylamino, nitro or amino;

$R^{15}$ is hydrogen or a radical $R^2$ and $R^{16}$ is methyl or a radical $R^2$.

* * * * *